No. 616,965. Patented Jan. 3, 1899.
J. A. PILCHER.
DRAFT RIGGING.
(Application filed Apr. 7, 1898.)

(No Model.) 4 Sheets—Sheet 1.

WITNESSES
INVENTOR
John A. Pilcher
his Attorney

No. 616,965. Patented Jan. 3, 1899.
J. A. PILCHER.
DRAFT RIGGING.
(Application filed Apr. 7, 1898.)
(No Model.) 4 Sheets—Sheet 2.

WITNESSES
F. H. Rittenour,
Henry T. Bright

INVENTOR
John A. Pilcher.
by J. W. Willis
his Attorney

No. 616,965. Patented Jan. 3, 1899.
J. A. PILCHER.
DRAFT RIGGING.
(Application filed Apr. 7, 1898.)
(No Model.) 4 Sheets—Sheet 3.
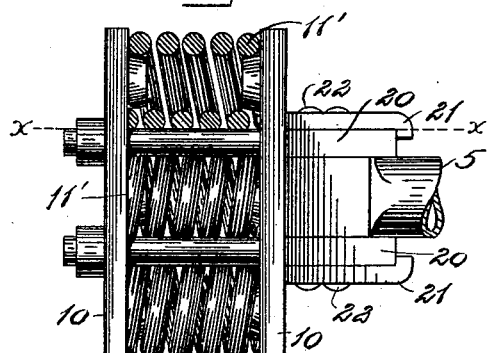
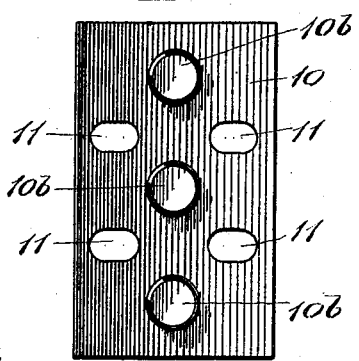
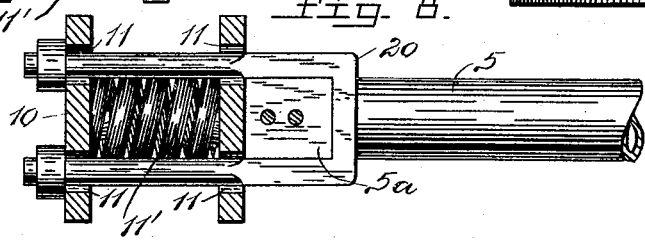
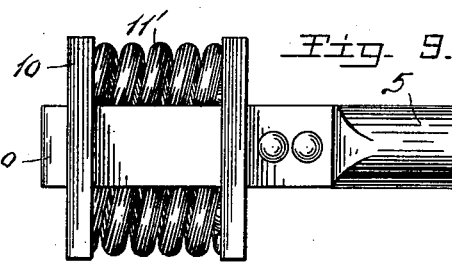
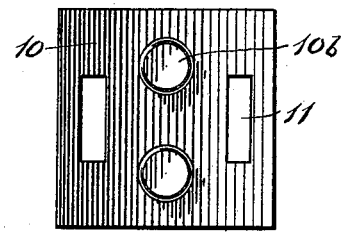
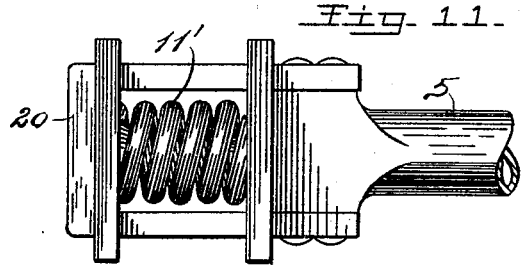
WITNESSES
INVENTOR
John A. Pilcher.
by J. W. Gillis
his Attorney No. 616,965. Patented Jan. 3, 1899.
J. A. PILCHER.
DRAFT RIGGING.
(Application filed Apr. 7, 1898.)
(No Model.) 4 Sheets—Sheet 4.

WITNESSES

INVENTOR
John A. Pilcher
by _____
his Attorney

UNITED STATES PATENT OFFICE.

JOHN A. PILCHER, OF ROANOKE, VIRGINIA, ASSIGNOR TO THE MISSOURI RAILWAY EQUIPMENT COMPANY, OF ST. LOUIS, MISSOURI.

DRAFT-RIGGING.

SPECIFICATION forming part of Letters Patent No. 616,965, dated January 3, 1899.

Application filed April 7, 1898. Serial No. 676,787. (No model.)

*To all whom it may concern:*

Be it known that I, JOHN A. PILCHER, a citizen of the United States, residing at Roanoke, in the county of Roanoke and State of Virginia, have invented certain new and useful Improvements in Draft-Rigging; and I do hereby declare the following to be a full, clear, and exact description of the invention, such as will enable others skilled in the art to which it appertains to make and use the same.

My invention relates to draft-rigging such as is used on railroad-cars; and the object thereof is to provide an improved form of this rigging which may be readily applied to any of the present cars, may be used in connection with the usual type of draw-head (commonly known as the "Master Car-Builders'" type) and with the usual draw-bar stops, and which will permit an increase in the spring force of the resistance both for buffing and draft.

My invention consists in the usual form of draw-bar, having certain novel arrangements of the spring-rigging attached thereto, as well as certain novel features of construction, combinations, and arrangements of parts hereinafter fully described, illustrated in the accompanying drawings, and specifically pointed out in the claims hereunto appended.

In the accompanying drawings like characters of reference indicate the same parts in the several views.

Figure 1:
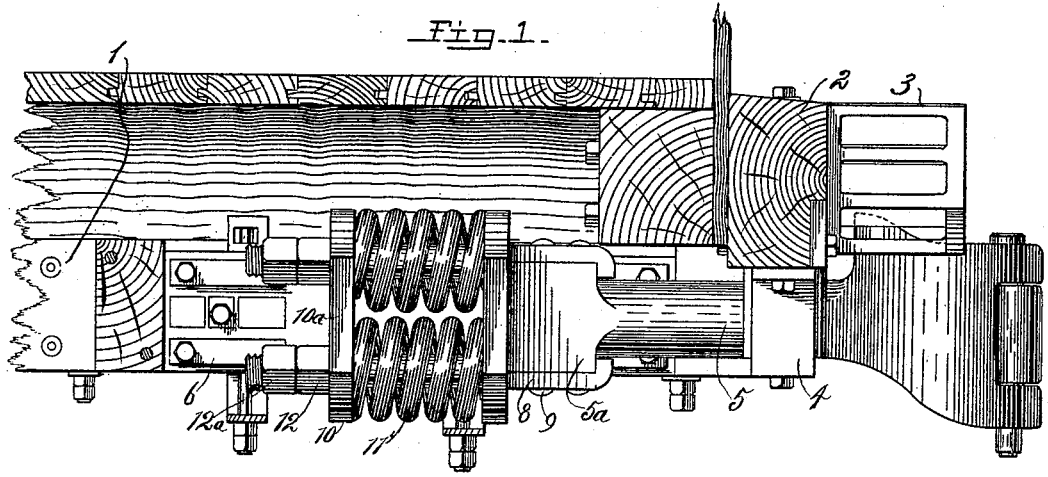
Figure 2:
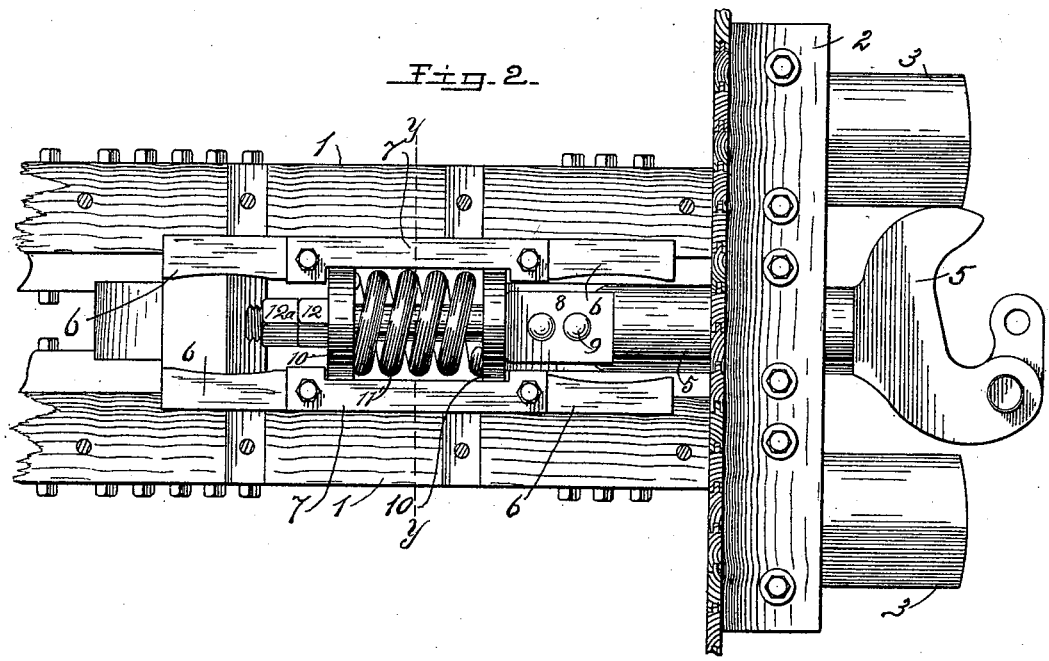
Figure 3:
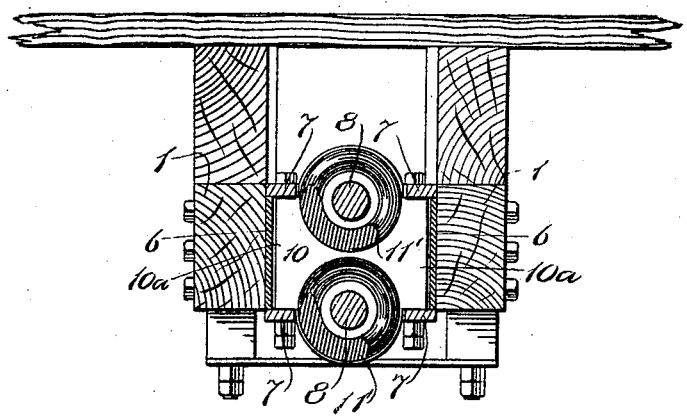
Figure 4:
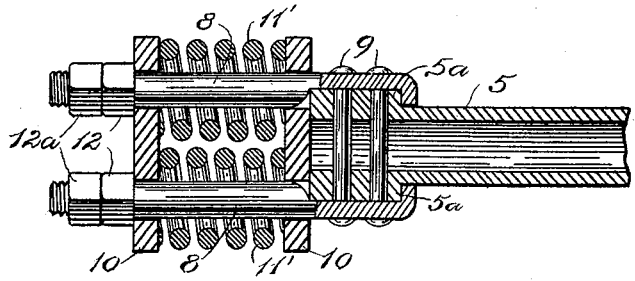
Figure 5:
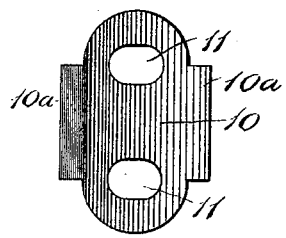
Figure 12:
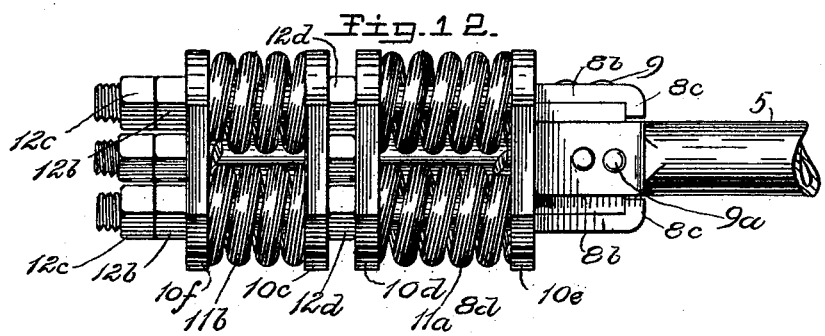
Figure 13:
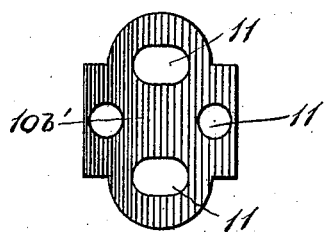
Figure 14:
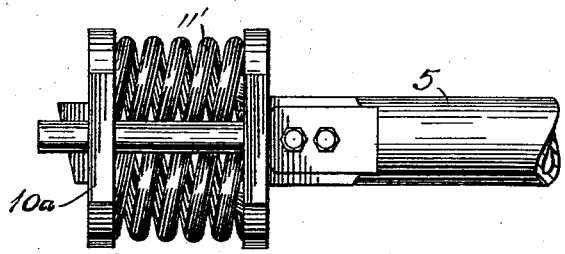
Figure 15:
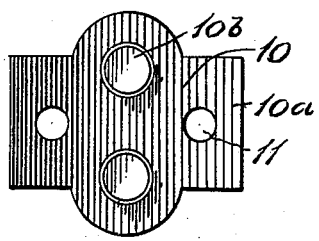

Figure 1 is a side elevation of my improved device in its preferred form and also shows a section through the floor of the car, one of the draft-timbers and the draw-bar stops attached thereto having been removed. Fig. 2 is a plan view of the draft-timbers and draft-rigging. Fig. 3 is a section of the same on the line Y Y. Fig. 4 is a detail vertical sectional view taken on the longitudinal median line of Fig. 2. Fig. 5 is a detail of one of the draw-bar follower-plates. Fig. 6 is a side elevation, partially in section, of the form of my invention in which three springs are superimposed. Fig. 7 is a view of the follower-plate used therewith. Fig. 8 is a sectional view of the same arrangement on the line X X of Fig. 6. Fig. 9 is a side elevation of the form in which a flat yoke-strap is used. Fig. 10 shows the follower-plate used therewith. Fig. 11 is a plan view thereof. Fig. 12 is a view showing a modification of my device for use with four springs. Fig. 13 is a view of the follower-plate used therewith. Figs. 14 and 15 are modified forms of the first-illustrated device.

For the purpose of illustrating the applicability of my device to cars as at present constructed I have shown in these drawings an arrangement of the draw-timbers, draw-bar stops, guides, and carrier-irons conforming to the standard adopted by the Master Car-Builders' Association. It will be observed that in this arrangement the draw-timbers are situated in such proximity that it is impossible to place two or more springs between them unless said springs are disposed vertically one above another. I am aware that springs have been thus arranged by others; but to the best of my knowledge I am not aware that the same has ever been accomplished without a change either to the shape of the tail end of the draw-bar or in some of the other parts of the draw-gear, and I am not aware that in any such vertical disposition of the springs the same have been used both to withstand the actions of buffing and draft.

The numerals 1 indicate the draw-timbers of the car, which are united with the rest of the frame in the usual manner. Numeral 2 indicates the buffing-block, and to this are attached the usual buffers 3. A draw-bar carrier-iron 4 is bolted or otherwise secured to the under side of this buffer-block. A draw-bar 5 is held to move in said carrier-iron. In the form shown in Fig. 1 lugs 5ª are provided upon the tail end of said draw-bar, this being the common method of arranging this part. Bolted or otherwise secured to the draw-timbers 1 are draw-bar stops 6. Draw-bar guides 7 are attached in the usual manner to said draw-bar stops 6.

In the preferred form of my device I attach to the draw-bar 5 tail-bolts 8, which are secured thereto by bolts 9, passing through the usual openings in the tail end of the draw-bar 5. It is obvious that these bolts may be secured to the draw-bar by bolting them through from side to side, as is illustrated in Fig. 14. It is also obvious that in the place of the pair of bolts arranged as in Fig. 1 I may use a yoke, as shown. Draw-bar follower-plates 10, having openings 11 therein, preferably elongated laterally, as shown in Fig. 5, are held upon the projecting ends of the tail-bolts 8 and are free to slide thereon. Lugs 10ª, formed upon these plates, project between the draw-bar guides 7 and are thereby held to move within said guides, their motion being limited by the draw-bar stops 6. Between the follower-plates 10 are springs 11', arranged one above the other in a vertical series. Nuts 12, held on the other end of the tail-bolts 8, serve to hold the rear follower-plate upon said bolts, thus limiting its motion in one direction and leaving it free to move in the other direction along said bolts. In the same manner the motion of the forward follower-plate is limited by the tail end of the draw-bar in one direction, but it is free to move relative to the tail-bolts in the opposite direction. The draw-bar stops 6 limit the motion of these plates relative to the draw-timbers. It is now plain that if a pull be exerted upon the draw-head the rear follower-plate 10 will be moved forward by the tail-bolts 8, but the front follower-plate will be held from moving by the front draw-bar stops 6, and the tail-bolts will be drawn through the openings in the front follower-plate, thus bringing said plates closer together and compressing the springs therebetween. In buffing the rear follower-plate is held stationary by the rear draw-bar stops, the front follower-plate is moved toward it, and the spring compressed, as in the previous case. By this means I obtain the usual compression of the springs as well from buffing as from draft. In order to retain the nuts 12 upon the tail-bolts 8, I use some one of the many well-known nut locking devices, and I have herewith the common form of locking-nut 12ª, although it is obvious that any other form would be of equal advantage.

When the yoke 8ª is used either in vertical arrangement (in which case the springs are usually held around the side bars of the yoke) or in horizontal arrangement, as shown in Fig. 2, it is obvious that the back of the yoke will act, as do the nuts 12, upon the tail-bolts. When either the tail-bolts 8 or the yoke 8ª are used in horizontal arrangement, I form upon the follower-plates spring-lugs 10ᵇ, and I also use these when more than two springs are to be applied in vertical arrangement.

Figs. 6, 7, and 8 show views of my device wherein three springs in vertical series are used. The numeral 20 shows a U-shaped yoke-strap extending around the lugs of the tail end of the draw-head. Cover-plates 21, held in place by bolts 22, serve to hold said yoke-strap in position. The rest of this modified arrangement is practically identical with that hereinbefore described, and the same reference-numerals are therefore used.

In Figs. 9, 10, and 11 a yoke-strap is also used; but in this instance the yoke-strap is bolted through from side to side of the tail end of the draw-head.

In Figs. 14 and 15 still another modification of my device is shown. It is not deemed necessary to enter into detail description of these last modifications, since the construction is perfectly obvious from the views shown.

Figs. 12 and 13 show the manner in which my device may be used with the springs in horizontal as well as vertical series. The draw-bar 5 is of the same form as in the previous figure. Tail-bolts 8ᵇ, having downwardly-bent ends 8ᶜ, are securely fastened to said draw-bar by means of the ordinary bolts 9, the downwardly-bent ends of the tail-bolts engaging the front ends of the lugs upon the draw-bar. Tail-bolts 8ᵈ, having flattened ends thereon, are held in position by bolts 9ª passing through the draw-head from side to side. Upon the tail-bolts are carried follower-plates 10ᶠ, 10ᵉ, 10ᵈ, and 10ᵉ. Springs 11ª and 11ᵇ are held upon the tail-bolts 8ᵇ and have an intermediate threaded portion. Nuts 12ᵇ, with lock-nuts 12ᶜ, serve to hold the follower-plates upon said tail-bolts. Nuts 12ᵈ, held upon the intermediate threaded portion of the tail-bolts, serve to keep the follower-plates 10ᵉ and 10ᵈ separated. The form of guide that is used with this device is provided with the usual center stop between the follower-plates 10ᵉ and 10ᵈ. In the operation of this device when the cars are coupled the rear draw-bar stop will prevent the plate 10ᶠ moving. The draw-head 5 peing pushed backward will carry therewith the plate 10ᵉ, and the nuts on the tail-bolts will move in the same direction, plate 10ᵉ thus compressing the springs 11ª and 11ᵇ. When draft is exerted, the reverse action takes place, the follower-plates 10ᵈ and 10ᵉ being held stationary and the follower-plates 10ᶠ and 10ᵉ being moved.

It is obvious that the springs may be arranged singly, as here shown for the sake of clearness, or may be arranged in nests in the usual way. It is also plain that beside the variants shown herewith many others, all embodying the same general principles, may be devised by any person having ordinary mechanical skill. I do not therefore desire to confine myself to nor limit myself by these forms that I have herein shown and described, but I desire to include all forms having the same general principles that exist in all this.

I have thus provided a simple construction to accomplish the purpose specified, which embraces in itself the essential features of applicability to existing cars, minimum of expense, and maximum of spring-power.

Having thus described my invention, what I claim as new, and desire to secure by Letters Patent, is—

1. In a car, draw-beams, a draw-head suspended between said draw-beams having lugs formed vertically upon the tail end thereof, a pair of tail-bolts, having downwardly-bent ends engaging said lugs, extending rearwardly from said draw-head, means for securing said tail-bolts to said draw-head, follower-plates held upon said tail-bolts, springs in a vertical series held between said follower-plates and draw-stops attached to said draw-beams to limit the motion of said follower-plates whereby said springs are compressed both during buffing and draft.

2. In a car, draw-beams, a draw-head suspended between said draw-beams, tail-bolts attached to said draw-head and extending rearwardly therefrom, follower-plates held upon said tail-bolts, springs in a plurality of vertical series held between said follower-plates, stops held upon said tail-bolts between each series of said springs and their accompanying follower-plates to limit the motion of the latter, and draw-stops held upon said draw-beams to limit the motion of the follower-plates and cause all of said springs to be compressed both during buffing and draft.

In testimony whereof I affix my signature in presence of two witnesses.

JNO. A. PILCHER.

Witnesses:
R. H. PERSINGER,
T. E. GRAHN.